United States Patent [19]
Hara et al.
[11] Patent Number: 4,510,073
[45] Date of Patent: Apr. 9, 1985

[54] METHOD FOR GRANULATING CATIONIC SURFACTANT

[75] Inventors: Noboru Hara, Tokyo; Shinichi Fukudome, Chiba; Nobuo Johna, Funabashi; Masayoshi Nakamura, Chiba, all of Japan

[73] Assignee: Lion Corporation, Tokyo, Japan

[21] Appl. No.: 510,243

[22] Filed: Jul. 1, 1983

[30] Foreign Application Priority Data

Jul. 5, 1982 [JP] Japan .............................. 57-116594
May 24, 1983 [JP] Japan .............................. 58-91370

[51] Int. Cl.$^3$ .............................. A23L 1/00
[52] U.S. Cl. .............................. 252/383; 264/117
[58] Field of Search .............................. 252/383; 264/117

[56] References Cited

U.S. PATENT DOCUMENTS 3,223,478 12/1965 Wilson .............................. 252/383
3,325,276 6/1967 Feller et al. .............................. 252/383
3,350,168 10/1967 Ziegler .............................. 252/383
4,051,054 9/1977 Davies et al. .............................. 252/383
4,261,941 4/1981 Sherman et al. .............................. 264/117
4,414,130 12/1983 Cheug .............................. 264/117

*Primary Examiner*—Paul Lieberman
*Assistant Examiner*—Willie Thompson
*Attorney, Agent, or Firm*—Armstrong, Nikaido, Marmelstein & Kubovcik

[57] ABSTRACT

A method for granulating a cationic surfactant having good water dispersibility and good storage stability comprising the steps of:

(i) mixing 100 parts by weight of a powdered di (long-chain alkyl) quaternary ammonium salt having an average particle diameter of 150 μm or less with 10 to 30 parts by weight of finely divided silica having an average primary particle diameter of 0.1 μm or less;

(ii) adding 20 to 80 parts by weight of a self-adhesive substance to the resultant mixture in the step (i), followed by granulation; and (iii) adding 30 to 150 parts by weight of at least one member selected from the group consisting of finely divided zeolite having an average primary particle diameter of 0.1 to 10 μm, finely divided calcium carbonate having an average primary particle diameter of 0.01 to 10 μm, and a mixture thereof, followed by granulation.

4 Claims, No Drawings

METHOD FOR GRANULATING CATIONIC SURFACTANT

BACKGROUND OF THE INVENTION

1. Field of the Invention

The present invention relates to a method for granulating a cationic surfactant and, more specifically, relates to a method for granulating a powdered di (long-chain alkyl) quaternary ammonium salt ("dialkyl quaternary salt" hereinbelow) to form granules having good storage stability and good water dispersibility.

2. Description of the Prior Art

Dialkyl quaternary salts are generally produced in a solution state. However, there are many fields of application where powdered or granular dialkyl quaternary salts are convenient. For example, in the case of a softening agent, when only a very small amount of a powdered dialkyl quaternary salt is added to a wash rinsing solution, a fabric-softening effect comparable to that of a conventional commercially available liquid softening agent can be obtained. However, a powdered dialkyl quaternary salt is not substantially manufactured due to its dusting effects and handling inconvenience. Accordingly, attempts have been made to produce granules of dialkyl quaternary salts from powdered dialkyl quaternary salts. However, the granules obtained from the use of conventional nonionic surfactants have poor water dispersibility after storage. This is based on the facts that the transition point is rapidly decreased by absorbing a large amount of moisture under a high humdity condition due to a high humidity sensitivity or hygroscopicity of the dialkyl quaternary salts, while the dialkyl quaternary salts rapidly desorb the moisture when humidity is decreased. That is, dialkyl quaternary salts absorb moisture to swell under an elevated temperature and high humidity and the molten dialkyl quaternary salt powder particles aggregate together with the decrease of the transition point and, then, are solidified upon dewatering.

It is known in the art that hygroscopic substances are generally mixed with inorganic powder capable of absorbing water as water of crystallization such as anhydrous sodium sulfate and anhydrous magnesium sulfate to granulate the hygroscopic substances. However, the amount of water which can be retained as water of crystallization in the inorganic substances is limited and, further, once absorbed as water of crystallization, the water is not desorbed again at a room temperature. Therefore, the water-proofing effect of these inorganic substances is lost during storage and the aggregation of the dialkyl quaternary salt powder particles cannot be prevented.

Furthermore, when the granulated particles are stored under an elevated temperature and high humidity, water particles dew condensed on the surfaces of the granulated particles cause the aggregation on adhesion of the granulated particles. Water-soluble inorganic substances are partially dissolved in dew condensed water and accelerate the aggregation or solidification of the granulated particles bonding the granulated particles together when the inorganic substances recrystallizing upon vaporization of the dew condensed water.

Alternatively, it is proposed to mix powdered dialkyl quaternary salts with only slightly water-soluble inorganic substances. However, calcium carbonate, aluminum hydroxide, and similar only slightly water-soluble inorganic substances are susceptible to permeation of water due to strong affinity thereof to water. Bentonite and similar only slightly water-soluble inorganic substances are tend to absorb water to swell and enlarge the distances between the adjacent inorganic substance particles, which cause easy permeation of water through the particles. Consequently, water dispersibility after storage is poor the prevention of caking is difficult.

SUMMARY OF THE INVENTION

Accordingly, the main object of the present invention is to obviate the above-mentioned problems of the granulation of dialkyl quaternary salts and to provide a method for granulating a cationic surfactant having good water dispersibility and good storage stability.

Other objects and advantages of the present invention will be apparent from the following description.

In accordance with the present invention, there is provided a method for granulating a cationic surfactant having good water dispersibility comprising the steps of:

(i) mixing 100 parts by weight of a powdered di (long-chain alkyl) quaternary ammonium salt having an average particle diameter of 150 μm or less with 10 to 30 parts by weight of finely divided silica having an average primary particle diameter of 0.1 μm or less;

(ii) adding 20 to 80 parts by weight of a self-adhesive substance to the resultant mixture in the step (i), followed by granulation; and (iii) adding 30 to 150 parts by weight of at least one member selected from the group consisting of finely divided zeolite having an average primary particle diameter of 0.1 to 10 μm, finely divided calcium carbonate having an average primary particle diameter of 0.01 to 10 μm, and a mixture thereof, followed by granulation.

DESCRIPTION OF THE PREFERRED EMBODIMENT

The present inventors have found that finely divided silica having an average primary particle diameter of 0.1 μm or less can effectively prevent the contact and aggregation of the granulated particles of dialkyl quaternary salts because the finely divided silica has especially strong affinity to the dialkyl quaternary salts and the silica powder is uniformly and densely adsorbed on the dialkyl quaternary salt particles due to the finely divided particles. Furthermore, it has been found that the finely divided silica can absorb water without causing any substantial change in the shape thereof after water absorption and, therefore, the enlargement of distances between the adjacent silica particles due to the water absorption. Thus, the finely divided silica has remarkably large effects to prevent swelling and softening of the dialkyl quaternary salt due to the moisture or water absorption thereof.

In addition to the above-mentioned effects of the finely divided silica, according to the present invention, distances between the adjacent finely divided silica particles are filled and the moisture absorption of the dialkyl quaternary salts is prevented by the addition of self-adhesive substances. Then, the mixture was granulated. Thereafter, finely divided zeolite having an average primary particle diameter of 0.1 to 10 μm, finely divided calcium carbonate having an average primary particle diameter of 0.01 to 10 μm, or a mixture thereof is adsorbed around the granulated particles to prevent the adhesion of the granulated particles to each other and also to increase the water absorption capability of the granulated particles under a high humidity condition and to facilitate the removal of water from the granulated particles under a low humidity condition.

The powdered dialkyl quaternary salts usable in the present invention are those having an average particle diameter of 150 μm or less and having the following general formula (I):

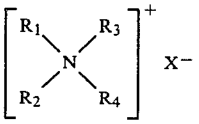
(I)

wherein $R_1$ and $R_2$ independently represent an alkyl group having 12 to 26 carbon atoms, $R_3$ and $R_4$ independently represent an alkyl group having 1 to 4 carbon atoms, a benzyl group, a hydroxyalkyl group having 2 to 4 carbon atoms, or a polyoxyalkylene group having 1 to 5 mole oxyalkylene units, and X represents a halogen atom, $CH_3SO_4$, $C_2H_5SO_4$, or

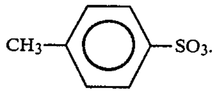

Typical examples of the dialkyl quaternary salts represented by the general formula (I) usable in the present invention are:

(1) distearyl dimethyl ammonium salts;
(2) dihydrogenated tallow alkyl dimethyl ammonium salts;
(3) dihydrogenated tallow alkyl benzyl methyl ammonium salts;
(4) distearyl methyl benzyl ammonium salts;
(5) distearyl methyl hydroxyethyl ammonium salts;
(6) distearyl methyl hydroxypropyl ammonium salts; and
(7) distearyl dihydroxyethyl ammonium salts.

Typical counter ions of the dialkyl quaternary salts are chloride and bromide.

The finely divided silica added to and mixed with the dialkyl quaternary ammonium salts according to the present invention should be those having an average primary particle diameter of 0.1 μm or less, desirably 0.05 μm or less, in view of the fact that the finely divided silica can uniformly and densely cover the surfaces of particles of the dialkyl quaternary salts in a small amount. The silica is added to the dialkyl quaternary salts in an amount of 10 to 30 parts by weight, desirably 15 to 30 parts by weight, based on 100 parts by weight of the dialkyl quaternary salts, followed by thorough mixing. The addition amount of the silica of less than 10 parts by weight based on 100 parts by weight of the dialkyl quaternary salts cannot result in sufficient coating over the particles of the dialkyl quaternary salts to cause poor water dispersibility of the dialkyl quaternary salts due to the aggregation or solidification thereof. Contrary to this, the addition amount of the silica of more than 30 parts by weight based on 100 parts by weight of the dialkyl quaternary salts does not further improve the water dispersibility of the dialkyl quaternary salts and naturally decreases the content of the dialkyl quaternary salts in the granular products, which is not commercially desirable.

The self-adhesive substances usable in the present invention are those which are in the form of liquid at an ordinary temperature or in the form of an aqueous solution and which are self-adhesive at a temperature of an ordinary temperature to 70° C. Typical examples of such self-adhesive substances are cellulose derivatives such as methyl cellulose (MC), hydroxymethyl cellulose (HMC), hydroxyethyl cellulose (HEC), and sodium carboxymethyl cellulose (CMC); water-soluble organic polymers such as polyvinyl alcohol (PVA), sodium polyacrylate, and polyethylene glycol (PEG); polyhydric alcohol such as glycerol; nonionic surfactants; and alkali metal silicates such as sodium silicate and sodium metasilicate. The nonionic surfactants usable as the self-adhesive substances in the present invention are desirably those having a high water-solubility, i.e., readily water-soluble nonionic surfactants. Examples of such nonionic surfactants are polyoxyethylene alkylphenyl ether having an ethylene oxide addition mole number ("$\bar{p}$" hereinbelow) of 4 to 30 mole and having an alkyl group with 6 to 18 carbon atoms, polyoxyethylene alkyl ether having an alkyl group with 10 to 24 carbon atoms, polyoxyethylenepolyoxypropylene alkylphenyl ether having an alkyl group with 6 to 18 carbon atoms, or polyoxyethylenepolyoxypropylene alkyl ether having an alkyl group with 10 to 24 carbon atoms. Typical examples of these nonionic surfactants are polyoxyethylene ($\bar{p}=8$) dodecyl ether, polyoxyethylene ($\bar{p}=10$) dodecyl ether, polyoxyethylene ($\bar{p}=28$) nonylphenyl ether, polyoxyethylene ($\bar{p}=10$) nonylphenyl ether, polyoxyethylene ($\bar{p}=20$) palmityl ether, polyoxyethylene ($\bar{p}=4$) polyoxypropylene ($\bar{p}=6$) dodecyl ether, polyoxyethylene ($\bar{p}=8$) polyoxypropylene ($\bar{p}=10$) tetradecyl ether, and polyoxyethylene ($\bar{p}=5$) polyoxypropylene ($\bar{p}=5$) nonylphenyl ether.

The self-adhesive substances can be used in the form of an aqueous solution, but it is desirable that the amount of water is as small as possible. The self-adhesive substances should be added to the dialkyl quaternary salts in an amount of 20 to 80 parts by weight, desirably 30 to 70 parts by weight, based on 100 parts by weight of the dialkyl quaternary salts. The addition amount of the self-adhesive substances of less than 20 parts by weight based on 100 parts by weight results in poor granulation properties, whereas the addition amount of the self-adhesive substances of more than 80 parts by weight based on 100 parts by weight forms adhesive granulated particles which readily cause aggregation or caking. When the nonionic surfactants are used as the self-adhesive substance in the present invention, the nonionic surfactants exhibit liquid or fluidized state or solid. The liquid or fluidized state surfactants can be used either as they are or in the form of as aqueous solution and the solid surfactants are used in the form of an aqueous solution. The water is desirably used in an amount of 30 parts by weight or less based on 100 parts by weight of the nonionic surfactants.

The finely divided zeolite and calcium carbonate usable in the present invention should have an average primary particle diameter of 0.01 to 10 μm, desirably 0.5 to 5 μm, so as to adsorb water under a high humidity condition and to rapidly desorb water under a low humidity condition. The addition amount of the finely divided zeolite, the finely divided calcium carbonate, or the mixture thereof should be 30 to 150 parts by weight, desirably 50 to 120 parts by weight, based on 100 parts by weight of the dialkyl quaternary salts. The addition amount of the zeolite and/or calcium carbonate of less than 30 parts by weight based on 100 parts by weight of the dialkyl quaternary salts does not sufficiently improve the caking property of the granulated particles. Contrary to this, the addition amount of the zeolite and/or calcium carbonate of more than 150 parts by weight based on 100 parts by weight of the dialkyl quaternary salts does not further improve the caking property of the granulated particles and naturally decreases the content of the dialkyl quaternary salts in the granular products, which is not commercially desirable.

According to the present invention, granular cationic surfactants having good water dispersibility and good storage stability can be granulated as follows. For example, dialkyl quaternary salts and finely divided silica are uniformly mixed together and, then, the above-mentioned self-adhesive substances are added thereto. The mixture is granulated and, then, the finely divided zeolite and/or calcium carbonate is coated over one or more granules thus obtained to form the desired granulated products containing 25% to 60% by weight of the dialkyl quaternary ammonium salts and having an average particle diameter of 300 to 800 μm, desirably 400 to 600 μm. The granulation of the granular cationic surfactants can be effected by using any conventional granulator under conventional conditions.

As mentioned above, according to the present invention, the dialkyl quaternary salts are first coated with the finely divided silica having a high affinity to the dialkyl quaternary salts and, then, the silica coated dialkyl quaternary salts are granulated by using, as a binder, the above-mentioned self-adhesive substances also having a high affinity to the dialkyl quaternary salts. Thus, the dialkyl quaternary salts are shielded from water by the silica and the self-adhesive substances. Even if the dialkyl quaternary salts adsorb some water to cause swelling and fluidization, the above-mentioned finely divided silica and self-adhesive substances are adsorbed over the freshly exposed surfaces of the dialkyl quaternary ammonium salt particles to prevent aggregation or caking of the swollen particles with each other. This, good water dispersibility is obtained. Furthermore, the zeolite and calcium carbonate prevent the adhesion and aggregation of the granulated particles together and, therefore, the caking of the resultant granular cationic surfactants can be effectively prevented.

As is clear from the above-mentioned detailed description and examples hereinbelow, the following advantageous effects can be obtained according to the present invention:

(1) The solidification of the granular dialkyl quaternary salts due to water or moisture absorption can be effectively prevented and the good water dispersibility of the granules after storage can be obtained;

(2) The granular cationic surfactants having a high dialkyl quaternary salt concentration and capable of appropriately dispersing in the form of a primary particles in water can be obtained. These granular cationic surfactants can be desirably used as, for example, softening agents and antistatic agents; and (3) When the resultant granular cationic surfactants are compounded into granular detergents containing, as a main ingredient, the caking of the resultant granular detergents after storage can be prevented.

EXAMPLE

The present invention now will be further illustrated by, but is by no means limited to, the following examples, in which all percentages and parts are expressed on a weight basis unless otherwise specified.

The water dispersibility and the caking properties due to moisture absorption were evaluated as follows:

(1) Water dispersibility

A 10 g amount of a sample granular cationic surfactant was added to 500 g of tap water at a temperature of 15° C. and the mixture was stirred for 10 minutes. The resultant total liquid mixture was passed through a sieve having a size of 24 meshes. Furthermore, 1 liter of tap water at a temperature of 15° C. was passed through the sieve. Thus, the sieve was washed. The sieve was then dried. From the weight increase of the sieve before and after the test, the residue (%) of the particles in the sieve was determined based on the following criteria:

+: Residue in sieve is less than 5%
±: Residue in sieve is between 5% and 15%
−: Residue in sieve is more than 15%

(2) Caking test due to moisture absorption

+: No caking
−: Caking occurs

EXAMPLES 1 TO 7

A 100 parts amount of powdered dialkyl (hardened tallow) dimethyl ammonium chloride (A) was placed in a rotary drum and, then, a given amount of the inorganic substance (B) listed in Table 1 was added thereto. The mixture was thoroughly mixed and a given amount of the nonionic surfactant (C) or the aqueous nonionic surfactant solution (C) listed in Table 1 was added thereto. While granulating the mixture, a given amount of the inorganic substance (D) was added to complete the granulation.

The resultant granular product thus obtained was stored under the conditions such that 20° C.×60% RH×15 hours and 45° C.×80% RH×9 hrs are recycled. After the storage, the water dispersibility and the caking properties due to moisture absorption of the granular products were evaluated according to the above-mentioned criteria.

The results are shown in Table 1.

As is clear from the results shown in Table 1, the water dispersibility and the caking properties due to moisture absorption of the granular products in Examples 1 and 2 according to the present invention were superior to those of Examples 3 to 7 (Comparative).

The abbreviations used in Table 1 are as follows:

(1) Liponox NCH: Polyoxyethylene nonylphenol ether (EO $\bar{p}=8$) available from Lion Corporation.
(2) Liponox NCG: Polyoxyethylene nonylphenol ether (EO $\bar{p}=7$) available from Lion Corporation.
(3) Liponox NCI: Polyoxyethylene nonylphenol ether (EO $\bar{p}=9$) available from Lion Corporation.
(4) PEG #200: Polyethylene glycol having an average molecular weight of 200 available from Yokkaichi Chemical Co., Ltd.
(5) PEG #400: Polyethylene glycol having an average molecular weight of 400 available from Yokkaichi Chemical Co., Ltd.
(6) Silica: Tokusil N having an average primary particle size of 0.02 μm available from Tokuyama Soda Co., Ltd.

(7) Zeolite: Silton B having an average primary particle size of 0.8 $\mu m$ available from Mizusawa Industrial Chemicals, Ltd.

(8) Calcium carbonate: Average particle diameter=20 $\mu m$.

(9) Sodium sulfate: average particle diameter=60 $\mu m$.

(10) Sodium carbonate: average particle diameter=130 $\mu m$.

As is clear from the results shown in Table 2, the water dispersibility and the caking properties due to moisture absorption of the granular products in Examples 8, 9, and 15 according to the present invention were superior to those of Examples 10 to 14 (Comparative).

The abbreviations used in Table 2 are as follows:

(1) Liponox NCH: Polyoxyethylene nonylphenol ether (EO $\bar{p}$=8) available from Lion Corporation.

(2) Liponox NCG: Polyoxyethylene nonylphenol ether (EO $\bar{p}$=7) available from Lion Corporation.

(3) PEG #200: Polyethylene glycol having an average molecular weight of 200 available from Yokkaichi Chemical Co., Ltd.

(4) PEG #400: Polyethylene glycol having an average molecular weight of 400 available from Yokkaichi Chemical Co., Ltd.

(5) Silica: Tokusil N having an average primary particle size of 0.02 $\mu m$ available from Tokuyama Soda Co., Ltd.

(6) Zeolite: Silton B having an average primary particle size of 0.8 $\mu m$ available from Mizusawa Industrial Chemicals, Ltd.

(7) Calcium carbonate: Average particle diameter=2 $\mu m$ (8) Anhydrous sodium sulfate: average particle diameter=60 $\mu m$.

(9) CMC: Carboxymethyl cellulose available from Shikoku Chemical Industries, Ltd.

TABLE 1

| Example | Quaternary salt (A) | Inorganic substance (B) | | Nonionic surfactant (C) | | Inorganic substance (D) | | Water dispersibility storage dates | | | | Caking property storage dates | | |
|---|---|---|---|---|---|---|---|---|---|---|---|---|---|---|
| No. | (parts) | Compound | parts | Compound | part | Compound | part | 0 | 7 | 14 | 30 | 7 | 14 | 30 |
| 1 | 100 | Silica | 20 | 85% aqueous Liponox NCH soln. | 45 | Zeolite | 70 | + | + | + | + | + | + | + |
| 2 | 100 | Silica | 25 | Liponox NCH | 45 | Zeolite | 100 | + | + | + | + | + | + | + |
| 3* | 100 | Zeolite | 30 | Liponox NCG | 45 | Silica | 100 | + | − | − | − | + | + | + |
| 4* | 100 | Calcium carbonate | 25 | 85% aqueous Liponox NCG soln. | 50 | Zeolite | 100 | + | − | − | − | − | − | − |
| 5* | 100 | Anhydrous sodium sulfate | 30 | PEG #200 | 45 | Sodium carbonate | 90 | + | − | − | − | − | − | − |
| 6* | 100 | Silica | 30 | Liponox NCI | 50 | Zeolite | 20 | + | + | + | ± | − | − | − |
| 7* | 100 | Silica | 5 | PEG #400 | 60 | Zeolite | 120 | + | − | − | − | − | − | − |

*Comparative example

EXAMPLES 8 TO 15

A 100 parts amount of powdered dialkyl (hardened tallow) dimethyl ammonium chloride (A) was placed in a rotary drum and, then, a given amount of the inorganic substance (B) listed in Table 2 was added thereto. The mixture was thoroughly mixed and a given amount of the self-adhesive substance (C) listed in Table 2 was added thereto. While granulating the mixture, a given amount of the inorganic substance (D) was added to complete the granulation.

The resultant granular product thus obtained was stored under the conditions such that 20° C.×60% RH×15 hours and 45° C.×80% RH×9 hrs are recycled. After the storage, the water dispersibility and the caking properties due to moisture absorption of the granular products were evaluated according to the above-mentioned criteria.

The results are shown in Table 2.

TABLE 2

| Example | Quaternary salt (A) | Inorganic substance (B) | | Nonionic surfactant (C) | | Inorganic substance (D) | | Water dispersibility storage dates | | | | Caking property storage dates | | |
|---|---|---|---|---|---|---|---|---|---|---|---|---|---|---|
| No. | (parts) | Compound | parts | Compound | part | Compound | part | 0 | 7 | 14 | 30 | 7 | 14 | 30 |
| 8 | 100 | Silica | 20 | 85% aqueous Liponox NCH soln. | 45 | Calcium carbonate | 70 | + | + | + | + | + | + | + |
| 9 | 100 | Silica | 25 | Liponox NCH | 45 | Calcium carbonate | 100 | + | + | + | + | + | + | + |
| 10* | 100 | Silica | 20 | 85% aqueous Liponox NCH soln. + PEG #400 | 45<br>25 | Calcium carbonate | 100 | + | + | + | + | + | + | + |
| 11* | 100 | Calcium carbonate | 25 | 85% aqueous Liponox NCH soln. + PEG #400 | 45<br>25 | Calcium carbonate | 100 | + | − | − | − | − | − | − |
| 12* | 100 | Silica | 5 | PEG #400 | 60 | Calcium carbonate | 120 | + | − | − | − | − | − | − |
| 13* | 100 | Zeolite | 30 | Liponox NCG | 45 | Calcium carbonate | 100 | + | − | − | − | − | − | − |
| 14* | 100 | Anhydrous sodium sulfate | 30 | PEG #200 | 45 | Calcium carbonate | 100 | + | − | − | − | − | − | − |
| 15 | 100 | Silica | 25 | CMC | 45 | Calcium | 100 | + | + | + | + | + | + | + |

TABLE 2-continued

| Example | Quaternary salt (A) | Inorganic substance (B) | | Nonionic surfactant (C) | | Inorganic substance (D) | | Water dispersibility storage dates | | | | Caking property storage dates | | |
|---|---|---|---|---|---|---|---|---|---|---|---|---|---|---|
| No. | (parts) | Compound | parts | Compound | part | Compound | part | 0 | 7 | 14 | 30 | 7 | 14 | 30 |
| | | | | | | carbonate | | | | | | | | |

*Comparative example

We claim:

1. A method for granulating a cationic surfactant having good water dispersibility comprising the steps of:

(i) mixing 100 parts by weight of a powdered di (long-chain alkyl) quaternary ammonium salt having an average particle diameter of 150 μm or less with 10 to 30 parts by weight of finely divided silica having an average primary particle diameter of 0.1 μm or less;

(ii) adding 20 to 80 parts by weight of a self-adhesive substance to the resultant mixture in the step (i), followed by granulation; and (iii) adding 30 to 150 parts by weight of at least one member selected from the group consisting of finely divided zeolite having an average primary particle diameter of 0.1 to 10 μm, finely divided calcium carbonate having an average primary particle diameter of 0.01 to 10 μm, and a mixture thereof, followed by granulation.

2. A method as claimed in claim 1, wherein said di (long-chain alkyl) quaternary ammonium salt is represented by the general formula (I)

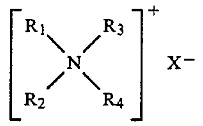

(I)

wherein $R_1$ and $R_2$ independently represent an alkyl group having 12 to 26 carbon atoms, $R_3$ and $R_4$ independently represent an alkyl group having 1 to 4 carbon atoms, a benzyl group, a hydroxyalkyl group having 2 to 4 carbon atoms, or a polyoxyalkylene group having 1 to 5 mole oxyalkylene units, and X represents a halogen atom, $CH_3SO_4$, $C_2H_5SO_4$, or

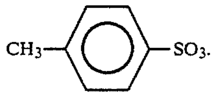

3. A method as claimed in claim 1, wherein said self-adhesive substance is at least one member selected from the group consisting of cellulose derivatives, water-soluble organic polymers, polyhydric alcohols, nonionic surfactants, and alkali metal silicates.

4. A method as claimed in claim 3, wherein said monionic surfactant is selected from the group consisting of polyoxyethylene alkylphenyl ether having an ethylene oxide addition mole number of 4 to 30 mole and having an alkyl group with 6 to 18 carbon atoms, polyoxyethylene alkyl ether having an alkyl group with 10 to 24 carbon atoms, polyoxyethylenepolyoxypropylene alkylphenyl ether having an alkyl group with 6 to 18 carbon atoms, and polyoxyethylenepolyoxypropylene alkyl ether having an alkyl group with 10 to 24 carbon atoms.

* * * * *